(12) United States Patent
Ichinose

(10) Patent No.: US 7,019,628 B2
(45) Date of Patent: Mar. 28, 2006

(54) TIRE MONITORING AND KEYLESS ENTRY SYSTEM

(75) Inventor: Hidemi Ichinose, Mie (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/298,687

(22) Filed: Nov. 19, 2002

(65) Prior Publication Data

US 2004/0095231 A1    May 20, 2004

(51) Int. Cl.
*B60C 23/02* (2006.01)

(52) U.S. Cl. ..................... 340/442; 340/447
(58) Field of Classification Search ............. 340/447
See application file for complete search history.

(56) References Cited

U.S. PATENT DOCUMENTS

| | | | |
|---|---|---|---|
| 5,463,374 A * | 10/1995 | Mendez et al. | 340/442 |
| 5,963,128 A * | 10/1999 | McClelland | 340/447 |
| 6,232,875 B1 * | 5/2001 | DeZorzi | 340/442 |
| 6,505,507 B1 * | 1/2003 | Imao et al. | 73/146.5 |
| 6,597,284 B1 * | 7/2003 | Juzswik | 340/442 |
| 6,630,885 B1 * | 10/2003 | Hardman et al. | 340/505 |
| 2004/0036591 A1 * | 2/2004 | Desai et al. | 340/445 |

FOREIGN PATENT DOCUMENTS

| JP | 62-87816 A | 4/1987 |
|---|---|---|
| JP | 3-135810 A | 6/1991 |
| JP | 2000-16037 A | 1/2000 |
| JP | 2000-118214 A | 4/2000 |
| JP | 2000-289418 A | 10/2000 |
| JP | 2000-355203 A | 12/2000 |

* cited by examiner

*Primary Examiner*—Jeffery Hofsass
*Assistant Examiner*—Eric M. Blount
(74) *Attorney, Agent, or Firm*—Birch, Stewart, Kolasch & Birch, LLP

(57) ABSTRACT

Door opening and closing control information transmitted from a portable transmitter 3 is received at a receiving apparatus 20 to drive a door locking mechanism 4. A tire sensor unit 10 mounted on each tire 2 detects tire pressure and tire internal temperature and radio-transmits those data and identification information. A signal transmitted from the tire sensor unit 10 is received at the receiving device 20 to be supplied to a display device 30. A tire abnormality judging section 31 lights a warning lamp 32 when the air pressure drops to the lower level than an air pressure drop detecting threshold value and the temperature is higher than a temperature rise detecting threshold value. The tire abnormality judging section 31 also sounds an alarm buzzer 33 to inform the tire abnormality.

10 Claims, 4 Drawing Sheets

FIG. 3

| Car identification information (Car ID) | Signal classification (Tire ID) | Control information or tire condition information | | Contents of a signal |
|---|---|---|---|---|
| 0001 0000 0001 0000 | 0000 0001 | **** **** | **** **** | Keyless entry system Door locking / unlocking |
| 0001 0000 0001 0000 | 0001 0000 | **** **** | **** **** | Tire monitoring system Front right wheel Air pressure Temperature |
| 0001 0000 0001 0000 | 0010 0000 | **** **** | **** **** | Tire monitoring system Front left wheel Air pressure Temperature |
| 0001 0000 0001 0000 | 0011 0000 | **** **** | **** **** | Tire monitoring system Rear right wheel Air pressure Temperature |
| 0001 0000 0001 0000 | 0100 0000 | **** **** | **** **** | Tire monitoring system Rear left wheel Air pressure Temperature |
| 16 bits | 8 bits | 8 bits Air pressure data | 8 bits Temperature data | |

TIRE MONITORING AND KEYLESS ENTRY SYSTEM

BACKGROUND OF THE INVENTION

1. Field of the Invention

The present invention relates to a tire monitoring system which can receive the information on a tire condition such as tire pressure transmitted from wireless-type tire sensors mounted on each tire using a receiver for a keyless entry system and inform the abnormality of a tire such as a puncture.

2. Description of the Prior Art

Japanese Unexamined Patent Publication No. Sho 62-87816 (1987) discloses a tire pressure related information display device in which a tire sensor for detecting tire pressure (i.e., tire air pressure) is mounted on each tire for radio transmission. The display device not only judges whether there is a puncture based on the detected tire pressure to display generation of the puncture, but also displays the distance in which the punctured tire can run.

Japanese Unexamined Patent Publication No. Hei 3-135810 (1991) discloses a tire pressure abnormality detecting method for preventing wrong detection of a puncture by tire pressure punctuation due to allotted or distributed load which varies with lateral acceleration or cross acceleration affecting a car body when a car is turned or suddenly braked. In this method, a moving amount of load is estimated in response to the acceleration detected by an acceleration sensor and the allotted or distributed load of each tire is corrected by the estimated moving amount of load. Then, an average tire pressure of each tire is set according to the allotted or distributed load corrected above. The detected tire pressure of each tire is compared with the average tire pressure serving as a reference tire pressure to detect abnormality of the tire pressure.

Japanese Unexamined Patent Publication No. 2000-16037 discloses a tire pressure information transmitting and receiving device in which the change of tire pressure after abnormality of the tire pressure has been generated can be detected on the side of a receiving device while reducing electric power consumption.

This tire pressure information transmitting and receiving device is construed as follows. Namely, a transmitting device transmits a tire pressure abnormal signal when abnormality of the tire pressure is detected. The transmitting device subsequently transmits the tire pressure abnormal signal and a tire pressure normal signal, respectively, only when there is caused a change of the tire pressure over a predetermined value and when the tire pressure returns to its normal condition. The transmitting device also transmits the tire pressure normal signal at regular hour intervals when the tire pressure is normal. A receiving device lights a first warning lamp when the tire pressure abnormal signal is received and lights a second warning lamp when any signal is not received over the regular hour.

Japanese Unexamined Patent Publication No. 2000-118214 discloses a tire internal pressure-monitoring device which can realize monitoring of the tire internal pressure for a long time while controlling electric power consumption.

This tire internal pressure-monitoring device is constructed as follows. Namely, when the tire internal pressure drops to a certain pressure level, a tire internal pressure detector closes a current-carrying switch to supply a coded information generating section and a telemeter transmitter with electricity from a power supply battery. Thus, a tire breakage danger signal is transmitted from a transmitting antenna. A receiving section receives the danger signal and then informs by an alarm that there is some possibility that the tire will be punctured.

Described in Japanese Unexamined Patent Publication No. 2000-289418 is a power supply unit with a built-in tire pressure sensor. In this power supply unit, the tire pressure sensor is provided inside a car tire and a battery is secured to the outside of the tire so that the battery can be directly detached and exchanged outside the car tire.

Japanese Unexamined Patent Publication No. 2000-355203 discloses a tire pressure warning device which detects abnormality of the tire pressure and informs it to a car body side by wireless. In this warning device, abnormality of the tire pressure can be immediately informed while holding the electric power consumption for detecting and informing the abnormality to the minimum.

This tire pressure warning device is constructed as follows. Namely, a tire-side warning device installed inside a tire is provided to allow a control circuit to actuate when a vibration sensor detects micro-vibration of the tire. The control circuit detects the pressure and temperature inside the tire by driving a pressure sensor and a temperature sensor and judges whether they are normal or abnormal. When they are abnormal, a transmitting circuit is driven to transmit a signal for showing the abnormal contents to a car body-side warning device. Since the control circuit stops its operation when the car is parked or stopped in which the tire does not vibrate, it is possible to prevent the battery consumption.

In such systems as to detect the abnormality of a tire to generate an alarm or the like, it is necessary to provide on a tire side a sensor for detecting a tire condition such as air pressure of the tire and temperature of the tire and a transmitter for radio-transmitting the information on the detected tire condition. It is also necessary to provide a receiver on a car body side.

Further, a car with a keyless entry system that can remotely control locking or unlocking of a door has come into wide use recently. In the case where the car with such a keyless entry system is further provided with a tire monitoring system, it is necessary to provide a receiver for the tire monitoring system as well as a receiver for the keyless entry system. In this case, it is not only economical, but also there is needed a space for installing the receivers.

On the other hand, the tire pressure also varies with an outside air temperature. A car tire is also heated by friction between itself and the road surface during running. Air inside the tire expands with this heating and the internal pressure remarkably fluctuates. Further, the heating varies in the case where a car is running at a constant speed, the speed is increased, the speed is reduced, the car is running in a city area, or it is running at high speed. Accordingly, in a conventional tire puncture detecting technique whereby a tire puncture is detected only based on the tire pressure, there is some possibility that the tire will be detected as punctured even in the case where the tire is not punctured.

Further, in such system as to detect abnormality of the tire to generate the alarm or the like, the tire pressure or the tire abnormal information is transmitted from the wireless-type tire sensor provided on each tire. In this case, it is not possible to judge which tire will be punctured. There is also some possibility that a wireless signal transmitted from a tire of the other adjacently running car will be received.

SUMMARY OF THE INVENTION

It is therefore an object of the present invention to solve the above-mentioned problems and to economically realize a tire monitoring system whereby the information on a tire condition transmitted by wireless from a tire side is received at a receiver for a keyless entry system.

It is another object of the present invention to provide a tire monitoring system which can inform which tire of a car is abnormal.

It is a still further object of the present invention to provide a tire monitoring system whereby tire pressure and tire internal temperature are detected and the tire is judged to be abnormal in the case where the tire pressure is lower than a predetermined value and the tire internal temperature is higher than the predetermined temperature so that a tire puncture and an abnormal condition in which the tire may be punctured can be precisely detected.

To solve the above-mentioned problems, a tire monitoring system according to the present invention is provided, which comprises a tire sensor unit mounted on each tire of a car to transmit the information on a tire condition by wireless, a receiving device provided on the side of a car body to receive the information on the tire condition transmitted from the tire sensor unit, and a display device for displaying a tire condition based on the information on the tire condition received at the receiving device, characterized in that the receiving device is constructed by utilizing a receiver for a keyless entry system of the car and the tire sensor unit is constructed to transmit in a radio signal method whereby the receiver for the keyless entry system can receive.

Since the information on the tire condition radio-transmitted from the tire sensor unit is received at the receiver for the keyless entry system, it is possible to economically realize the tire monitoring system.

The tire sensor unit is provided to transmit the car identification information for identifying a car, the tire identification information for identifying a tire, and the information on a tire condition. In this manner, it is possible to identify on the car body side that the tire belongs to a driver's car and which tire (i.e., a right front wheel, a left rear wheel, or the like) it is, and to inform which tire is abnormal.

Further, the tire sensor unit can be provided with a pressure sensor for detecting the tire pressure and a temperature sensor for detecting the tire internal temperature and radio-transmit the information on the tire pressure and the tire internal temperature as the information on the tire condition. On the other hand, the display device can also display the abnormality of tire pressure and the abnormality of temperature for each tire based on the information on the tire pressure and the tire internal temperature received via the receiving device.

The display device can also display that the tire is abnormal in the case where the tire pressure is lower than a predetermined value and the tire internal temperature is higher than a predetermined value based on the information on the tire pressure and the tire internal temperature received via the receiving device. In this manner, it is possible to avoid wrong information and accurately inform the abnormality of tire.

The tire sensor unit can be provided with a pressure sensor for detecting the tire pressure and a temperature sensor for detecting the tire internal temperature and transmit the tire abnormal information in the case where the tire pressure is lower than a predetermined value and the tire internal temperature is higher than a predetermined value. Since radio transmission is effected only when the tire abnormality is detected, it is possible to reduce the electric power consumption of the tire sensor unit.

The tire sensor unit can also be provided with an identification information storage section for storing the car identification information for identifying the car and the tire identification information for identifying the tire and can renew the car identification information and the tire identification information stored in the identification information storage section via a data communication section. In this manner, it is possible to set the car identification information and the tire identification information when the tire is changed.

BRIEF DESCRIPTION OF THE DRAWINGS

The above and other objects, features and advantages of the present invention will become more apparent from the following description when taken in conjunction with the accompanying drawings.

FIG. 3 is a view showing one example of a format of the radio transmission data.

DETAILED DESCRIPTION OF THE PREFERRED EMBODIMENTS

Figure 1:
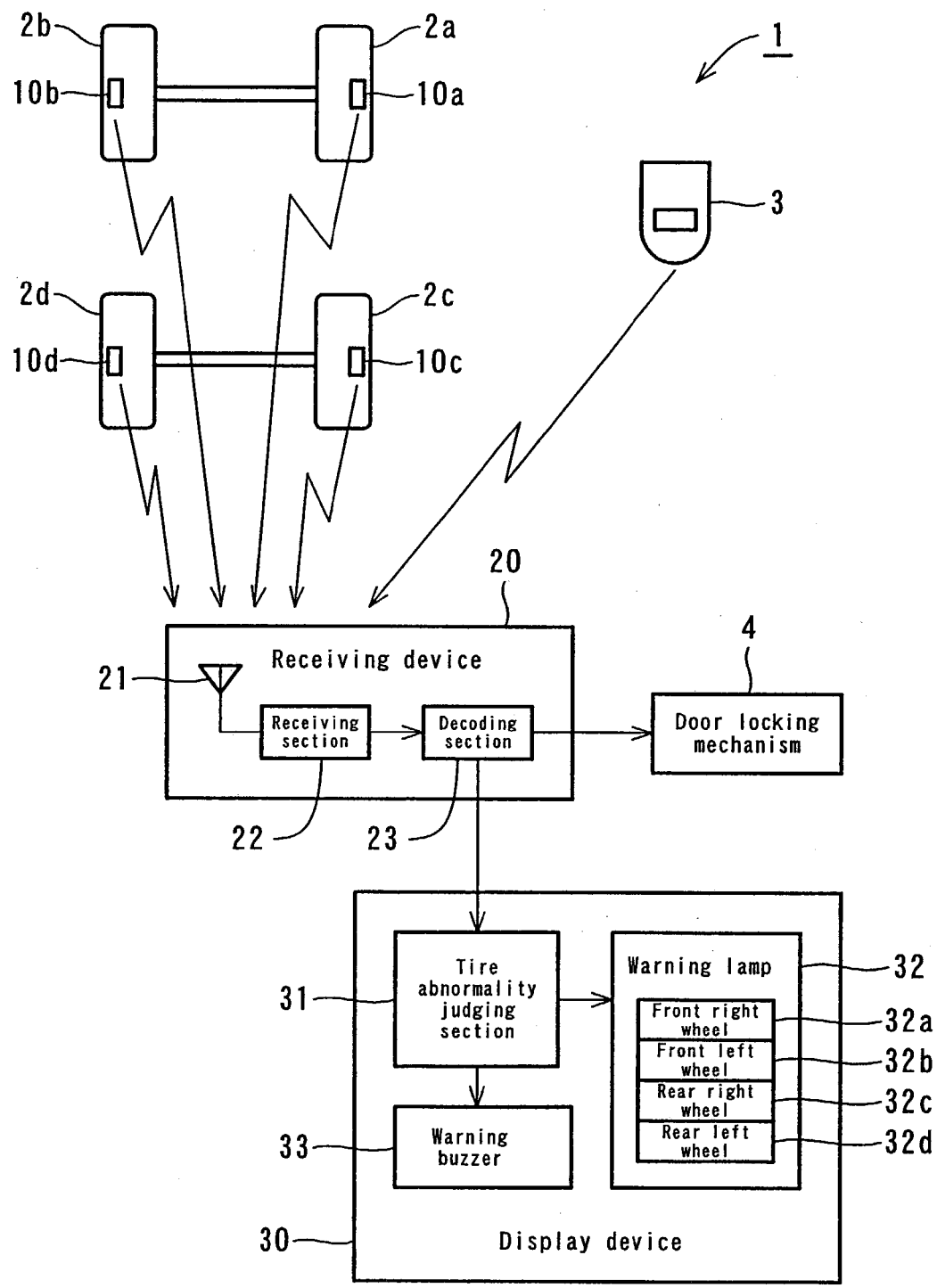
FIG. 1 is an entire block diagram of a tire monitoring system according to the present invention.
Figure 2:
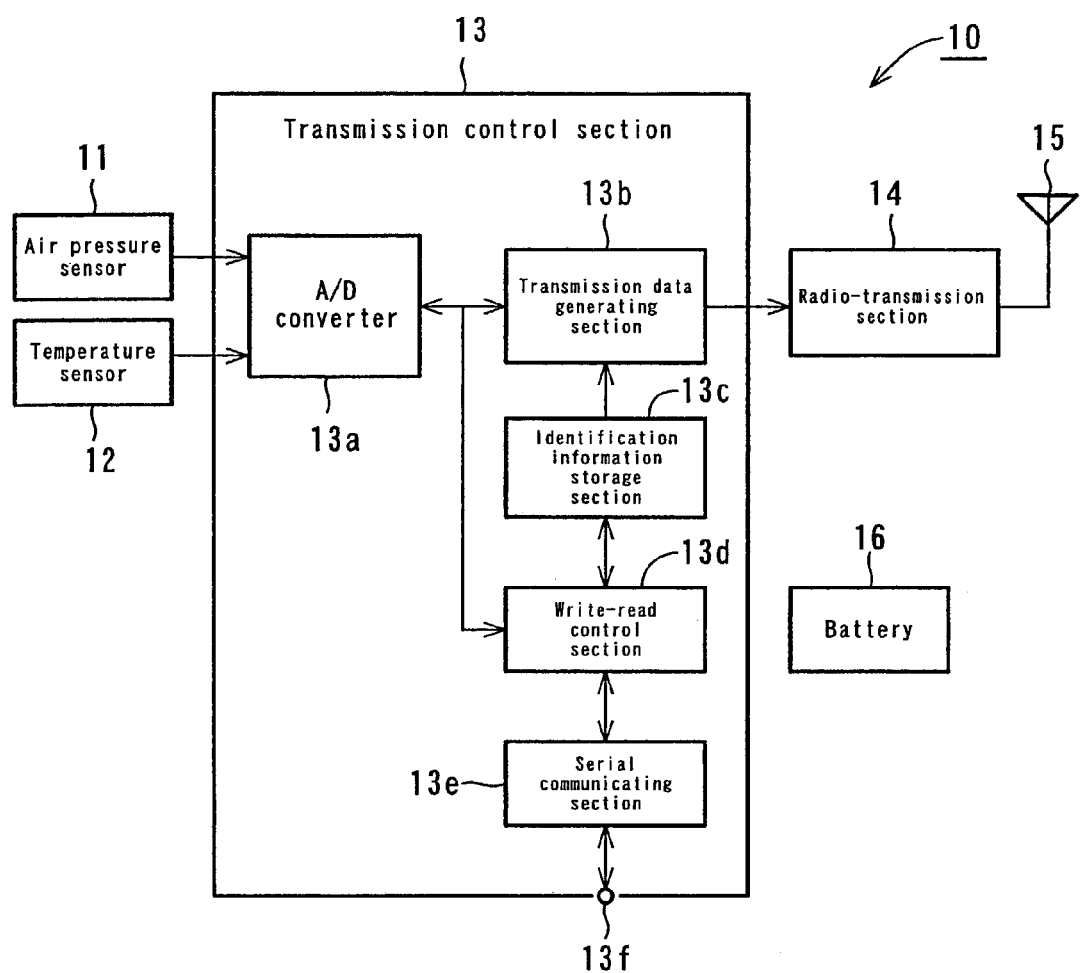
FIG. 2 is a block diagram of a tire sensor unit.

Preferred embodiments of the present invention will now be described with reference to the accompanying drawings. FIG. 1 is an entire block diagram of a tire monitoring system according to the present invention and FIG. 2 is a block diagram of a tire sensor unit.

As shown in FIG. 1, a tire monitoring system 1 consists of each tire sensor unit 10 (10a, 10b, 10c, and 10d) respectively mounted on each tire 2 (a front right wheel 2a, a front left wheel 2b, a rear right wheel 2c, and a rear left wheel 2d) of a car, a receiving device 20 provided on the side of a car body, and a display device 30 also provided on the side of the car body. The tire sensor unit 10 is mounted on a wheel rim section of the tire.

In the figure, reference numeral 3 is a portable transmitter (i.e., a keyless entry signal transmitter) and reference numeral 4 is a door locking mechanism. The portable transmitter 3, the receiving device 20, and the door locking mechanism 4 form a keyless entry system for remote-controlling locking and unlocking operation of a door of the car.

In the present embodiment, the keyless entry system for remote-controlling locking and unlocking operation of the door is shown as one example, but opening and closing operation of a trunk, opening and closing operation of a power window or the like can also be remote-controlled.

The receiving device 20 is provided with a receiving antenna 21, a receiving section 22 for amplifying and demodulating a high frequency signal received at the antenna 21 to output data transmitted from each tire sensor unit 10 and the portable transmitter 3, and a decoding section 23 for decoding received data outputted from the receiving section 22.

The decoding section 23 first judges whether the received data directed to a driver's own car based on the car identification information among the received data. If the received data is directed to the driver's own car, the decoding section 23 judges whether the received data are those transmitted from the portable transmitter 3 or those transmitted from the tire sensor unit 10 based on the signal classification identification information among the received data. If the received data are those for a keyless entry system such as door locking/unlocking request data, the decoding section 23 supplies a door locking mechanism 4 with the data. The door locking mechanism 4 performs the locking/unlocking operation of a door based on the door locking/unlocking request data supplied from the receiving device 20. When the received data are those transmitted from the tire sensor unit 10, the decoding section 23 supplies a display device 30 with the received data.

If the received data is directed to the driver's own car, the coding section 23 can be constructed to supply the door locking mechanism 4 and the display device 30 with the received data excluding the car identification information. In this case, the door locking mechanism 4 and the display device 30 are constructed to judge whether the received data are those for the keyless entry system or those for the tire monitoring system.

Further, the receiving device 20 can be constructed to have the antenna 21 and the receiving section 22 to supply the door locking mechanism 4 and the display device 30 with the received data. In this case, the door locking mechanism 4 and the display device 30 are constructed to have the decoding section to judge whether the received data are those for the driver's own car, those for the keyless entry system, or those for the tire monitoring system. In this construction, the car identification information for the keyless entry system can be different from the car identification information for the tire monitoring system.

The display device 30 is provided with a tire abnormality judging section 31, a warning lamp 32, and a warning buzzer 33. The construction and operation of the display device 30 will be described later.

As shown in FIG. 2, the tire sensor unit 10 comprises an air pressure sensor 11, a temperature sensor 12, a transmission control section 13, a radio transmission section 14, an antenna for transmission 15, and a battery 16 serving as a power source. The transmission control section 13 is provided with an A/D converter 13*a*, a transmission data generating section 13*b*, an identification information storage section 13*c*, a write-read control section 13*d*, and a serial communicating section 13*e*. Reference numeral 13*f* is an input/output terminal block or group for serial data.

Output of the air pressure sensor 11 and output of the temperature sensor 12 are supplied to the A/D converter 13*a* to be converted to digital data (i.e., air pressure data, temperature data). The identification information storage section 13*c* is constructed using a nonvolatile memory or the like and stores the car identification information (car ID) and the tire identification information (tire ID) therein. It is possible to renew the car identification information (car ID) and the tire identification information (tire ID) stored in the identification information storage section 13*c* by supplying the write/read control section 13*d* with a write command, the car identification information (car ID) and the tire identification information (tire ID) via the serial communicating section 13*e*. It is also possible to output the air pressure data and the temperature data to the outside via the serial communicating section 13*e* by supplying the write/read control section 13*d* with a sensor data read command via the serial communicating section 13*e*. Accordingly, it is possible to check the motion of each sensor 11, 12 and the A/D converter 13*a* by utilizing this sensor data reading function.

The transmission data generating section 13*b* starts the A/D converting motion of the A/D converter 13*a* for predetermined time intervals to obtain the air pressure data and the temperature data and temporarily stores the obtained data. The transmission data generating section 13*b* obtains the air pressure difference between the previously obtained air pressure data and the newly obtained air pressure data. The transmission data generating section 13*b* also obtains the temperature difference between the previously obtained temperature data and the newly obtained temperature data. When the air pressure difference is higher than a predetermined pressure change allowance and the temperature difference is higher than a predetermined temperature change allowance, the transmission data generating section 13*b* generates transmission data to be supplied to the radio transmission section 14.

The radio transmission section 14 generates a signal obtained by modulating a carrier wave of a predetermined carrier frequency by a predetermined modulating method based on the transmission data and radio-transmits the signal from the antenna 15. The frequency of the carrier wave and the modulating method thereof are the same as the portable transmitter (i.e. a keyless entry signal transmitter). In other words, the specification of radio signal of the keyless entry system and the specification of the radio signal of the tire monitoring system are provided in common. In this manner, it is possible to receive the information on the tire using the receiving device for the keyless entry system.

The transmission data comprises the car identification information (car ID), the tire identification information (tire ID), the air pressure data, and the temperature data. The tire identification information (tire ID) includes the information for distinguishing among a front right wheel, a front left wheel, a rear right wheel, and a rear left wheel. The tire identification information (tire ID) can include the information on the type of tire.

In the case where the transmission data of the keyless entry system is in the order of the preamble data, the frame synchronizing data, and the data to be transmitted, the transmission data generating section 13*b* generates the transmission data of the same data format as above. Further, the transmission data generating section 13*b* can generate the error check data such as the CRC (Cyclic Redundancy Check) data for or relative to the data to be transmitted (i.e., the car identification information, the tire identification information, the air pressure data, and the temperature data). The generated error check data can be added thereto. By adding the error check data, the receiving device can check presence of the error of the receiving signal and correct the error.

The transmission data generating section 13*b* can transmit the data (first time) via the radio transmission section 14, transmit the same data (second time) when the randomly set time has passed, and then transmit the same data again (third time) when the randomly set time has passed since the second time transmission. In this manner, since the radio transmission timing from a plurality of tire sensor units 10 coincides with each other, it is possible to correctly receive the data on the receiving device side.

FIG. 3 is a view showing one example of a format of the radio transmission data. The portable transmitter 3 and the tire sensor unit 10 transmit the data of 40 bits in total. The first 16 bits of data show the car identification information (car ID), the next 8 bits of data show the signal description or classification, and the last 16 bits of data show the control information or the tire condition information. The data is distinguished into the signal for the keyless entry system or the signal for tire monitoring system by the signal description or classification. In the case of the signal for the tire monitoring system, the signal classification becomes the tire identification information (tire ID). With this tire identification information (tire ID), a front right wheel, a front left wheel, a rear right wheel, and a rear left wheel are distinguished. In the signal for the keyless entry system, the upper 8 bits of the control information show the door locking control information, while the lower 8 bits of the control information show the door unlocking control information. In the signal for the tire monitoring system, the upper 8 bits of the tire condition information are the tire pressure data, while the lower 8 bits of the tire condition information are the tire internal temperature data.

The tire abnormality judging section 31 within the display device 30 shown in FIG. 1 judges whether the tire is abnormal or not based on the tire identification information (tire ID), the air pressure data, and the temperature data supplied from the receiving device 20. If the tire was judged to be abnormal, the tire abnormality judging section 31 lights the warning lamp 32 and buzzes the warning buzzer 33 to inform that the tire abnormality was detected. The warning lamp 32 is provided with indicators 32a–32d corresponding to each tire so as to visibly indicate which tire is abnormal.

Figure 4:
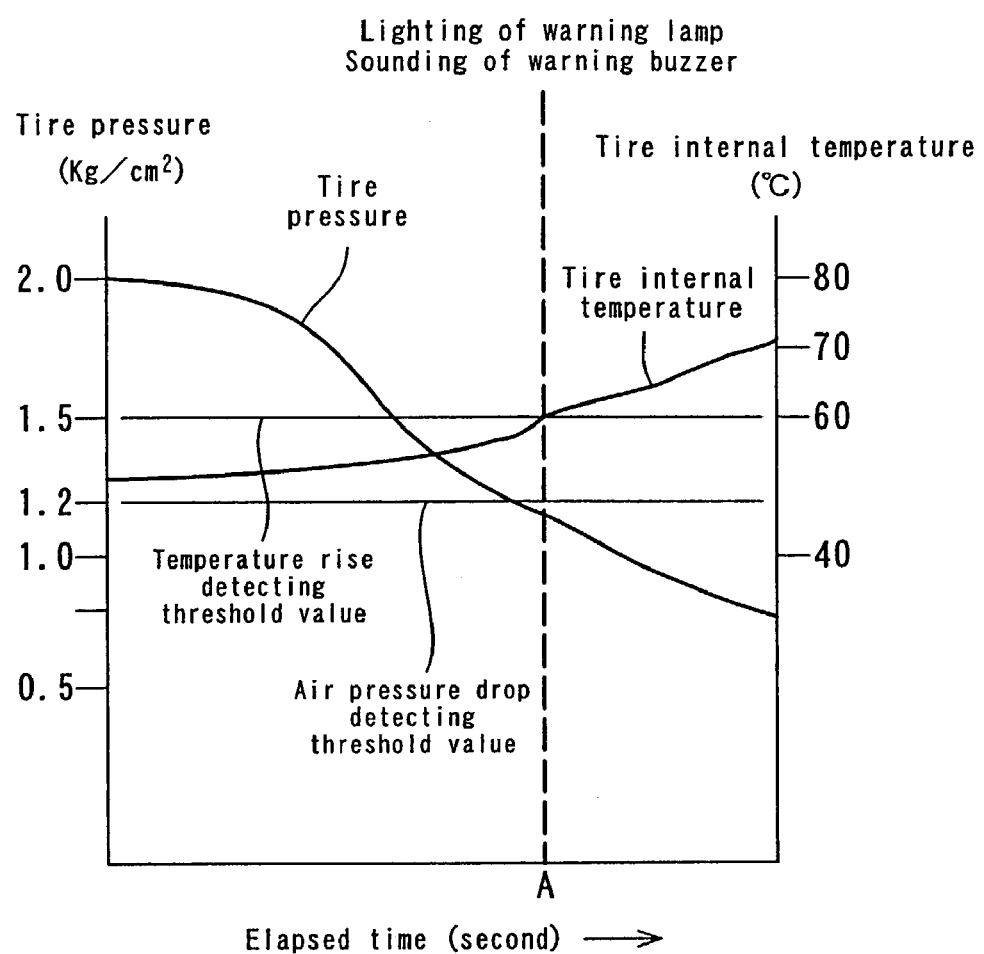
FIG. 4 is a graph showing the relationship between tire pressure and tire internal temperature.

FIG. 4 is a graph showing the relationship between the tire pressure and the tire internal temperature. Usually, the tire pressure is about 2.0 Kg/cm$^2$ and the tire internal temperature is 50° C.-60° C. When the tire is punctured, the air pressure drops to 1.2 Kg/cm$^2$-0.8 Kg/cm$^2$ and the tire internal temperature goes up to 60° C.-70° C. Accordingly, in the present embodiment, an air pressure drop detecting threshold value is set to 1.2 Kg/cm$^2$ and a temperature rise detecting threshold value is set to 60° C., respectively.

The tire abnormality judging section 31 lamps the warning lamp 32 and buzzes the warning buzzer 33 at a point A when the tire pressure is lower than the air pressure drop detecting threshold value and the tire internal temperature is higher than the temperature rise detecting threshold value. In this manner, the tire abnormality judging section 31 can inform the driver and the like of the abnormality of the tire. Since which tire is abnormal is displayed by the indicators 32a–32d, the tire which needs the inspection, repair, change or the like can be easily found.

The warning lamp 32 can be provided with an indicator for showing the air pressure drop and an indicator for showing the tire internal temperature rise. In this case, the tire abnormality judging section 31 can be provided to respectively judge the air pressure drop and the tire internal temperature rise to independently display the air pressure drop and the tire internal temperature rise. Further, a voice synthesizer can be provided in place of the warning buzzer 33 so that the abnormality of tire can be informed by a voice message saying for example "the air pressure of the right front wheel is reducing".

In the present embodiment, it is shown that the information on the tire pressure and the tire internal temperature transmitted from the tire sensor unit 10 side is received at the receiving device 20 and the tire abnormality is judged on the car side based on the received tire pressure and tire internal temperature. However, the tire abnormality judging section can be provided inside the tire sensor unit 10 to radio-transmit the tire abnormality detecting information in the case where the tire is judged abnormal. With this construction, since radio-transmission is effected only when the tire abnormality is detected, it is possible to remarkably reduce the electric power consumption of the tire sensor unit 10.

As described above, since the tire monitoring system according to the present invention is designed to receive the information on the tire condition radio-transmitted from the tire sensor unit by using the receiver for the keyless entry system, it is possible to economically realize the tire monitoring system.

Since the tire sensor unit transmits the car identification information for identifying the car, the tire identification information for identifying the tire, and the information on the tire condition, it is possible to identify that the tire is one for a driver's car and which tire it is (the right front wheel, the left rear wheel, or the like) on the side of a car body and to inform which tire is abnormal.

The tire monitoring system according to the present invention is provided to detect that the tire is abnormal. In the case where the tire pressure drops to the lower level than a predetermined value and the tire internal temperature goes up to the higher level than a predetermined value, the tire monitoring system is provided to judge that the tire is judged abnormal. Accordingly, it is possible to reduce the wrong information and precisely inform the abnormality of the tire.

What is claimed is:

1. A tire monitoring system comprising:
   a tire sensor unit mounted on each tire of a car to transmit information on a tire condition by radio;
   a receiving device provided in a car body to receive the information on the tire condition transmitted from the tire sensor unit; and
   a display device for displaying the tire condition based on the information on the tire condition received at the receiving device,
   wherein the receiving device is constructed by utilizing a receiver for a keyless entry system for the car, and the tire sensor unit is designed to transmit the car identification information, signal classification information and control information/tire condition information in a radio signal method whereby the receiver for the keyless entry system can receive, and
   wherein the tire sensor unit generates and adds error check data to the transmitted data so that the receiving device can check a presence of an error of a received signal and correct the error.

2. The tire monitoring system according to claim 1, wherein the display device is designed to display an abnormality of the tire condition for each of the tires based on the information on the tire condition received at the receiving device.

3. The tire monitoring system according to claim 1,
   wherein the tire sensor unit is provided with a pressure sensor for detecting tire pressure and a temperature sensor for detecting temperature inside the corresponding tire and radio-transmits the information on the tire pressure and the temperature inside the tire as the information on the tire condition only when the tire condition is an abnormality, and
   wherein the display device is designed to display the abnormality of the tire pressure and the abnormality of the temperature for each of the tires based on the information on the tire pressure and the temperature inside each of the tires received via the receiving device.

4. The tire monitoring system according to claim 1, wherein the tire sensor unit is provided with a pressure sensor for detecting tire pressure and a temperature sensor for detecting the temperature inside each of the tires and radio-transmits the information on the tire pressure and the temperature inside each of the tires as the information on the tire condition, and wherein the display device is designed to display the tire to be abnormal in the case where the tire pressure is lower than a predetermined value and the temperature inside the tire is higher than a predetermined value, based on the information on the tire pressure and the temperature inside the tire received via the receiving device.

5. The tire monitoring system according to claim 1, wherein the tire sensor unit is provided with a pressure sensor for detecting tire pressure and a temperature sensor for detecting temperature inside each of the tires, and designed to transmit the tire abnormality information in the case where the tire pressure is lower than a predetermined value and the temperature inside the tire is higher than a predetermined value.

6. The tire monitoring system according to claim 1, wherein the tire sensor unit is provided with an identification information storage section for storing a car identification information for identifying the car and a tire identification information for identifying each of the tires, and designed to be able to renew the car identification information and the tire identification information stored in the identification information storage section via a data communication section.

7. The tire monitoring system according to claim 1, wherein the display device has one display indicator corresponding to each one of the tires so that when the tire condition of one or more of the tires is an abnormality, the tire condition of the one or more of the tires with the abnormality may be displayed separately.

8. The tire monitoring system according to claim 1, wherein the tire sensor unit includes an A/D converter and a transmitting data generating section, the A/D converter for converting air pressure data and temperature data to digital data, and the transmission data generating section for generating transmission data to be supplied to a radio transmission section only when predetermined values are met for both of the air pressure data and the temperature data indicating that the tire condition of one or more of the tires is considered to be an abnormality.

9. The tire monitoring system according to claim 1, wherein the car identification information is 16 bits, the signal classification information is 8 bits and the control information/tire condition information is 16 bits, and wherein the signal classification information distinguishes the signal for the keyless entry system and a signal for the tire monitoring system.

10. The tire monitoring system according to claim 9, wherein the control information/tire condition information is control information to be divided into 8 bits for door locking control information and 8 bits for door unlocking control information in the case where the signal is for the keyless entry system, and the control information/tire condition information is tire condition information to be divided into 8 bits for air pressure data and 8 bits for temperature data.

* * * * *